Feb. 9, 1926. 1,571,974
P. W. SIMONS ET AL
COMBINED HARROW AND FLOAT OR CLOD CRUSHER
Filed April 7, 1924 3 Sheets-Sheet 2
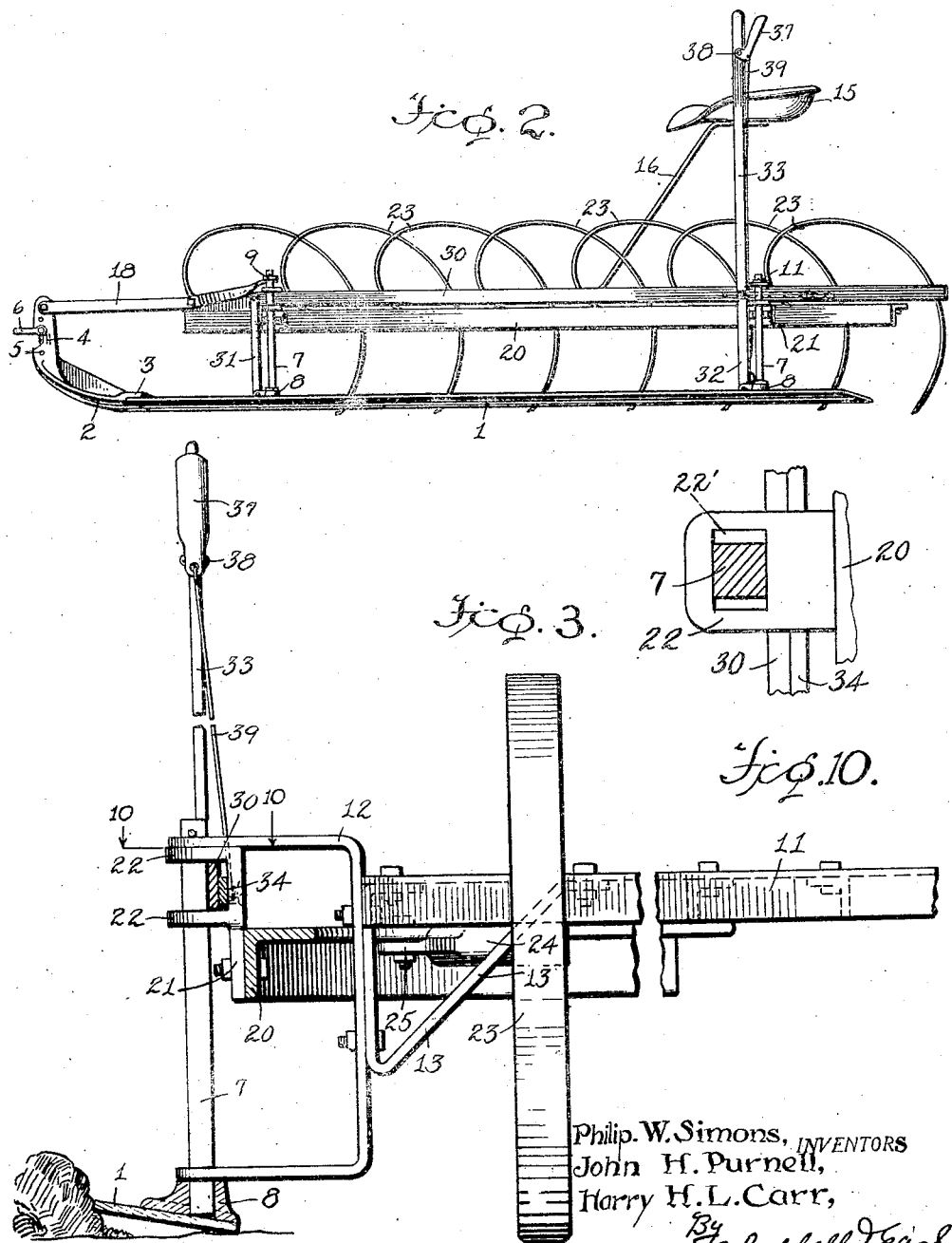

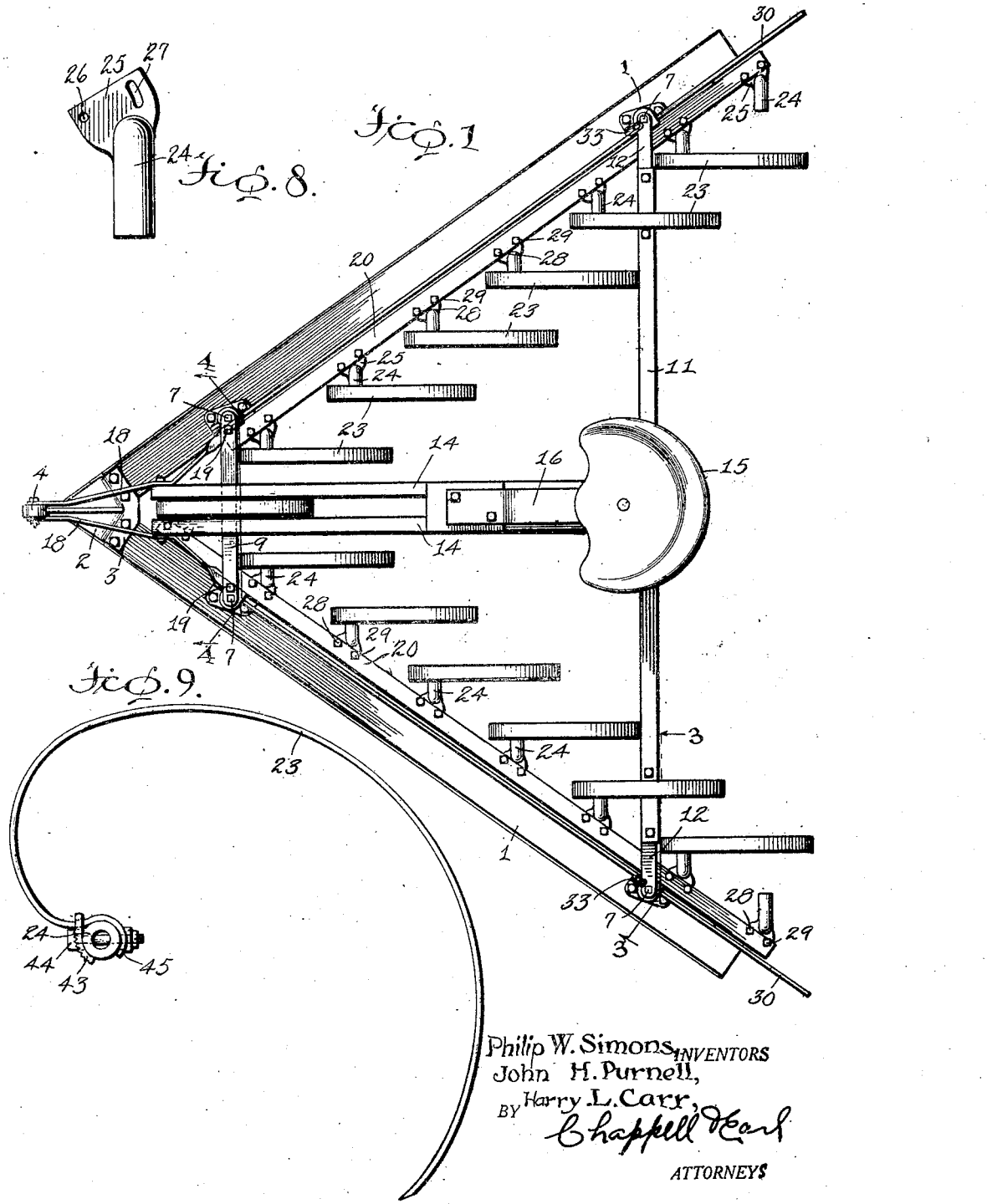

Feb. 9, 1926.
P. W. SIMONS ET AL
1,571,974
COMBINED HARROW AND FLOAT OR CLOD CRUSHER
Filed April 7, 1924      3 Sheets-Sheet 3
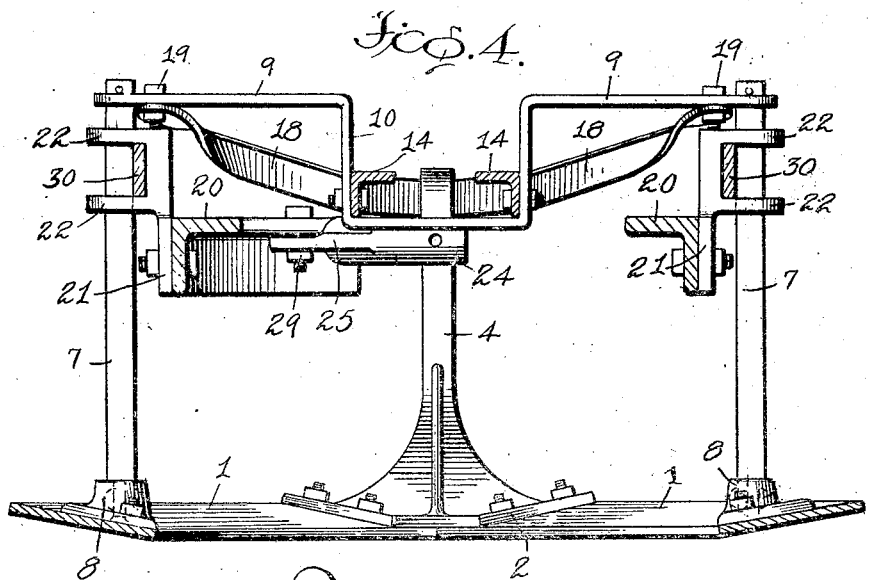
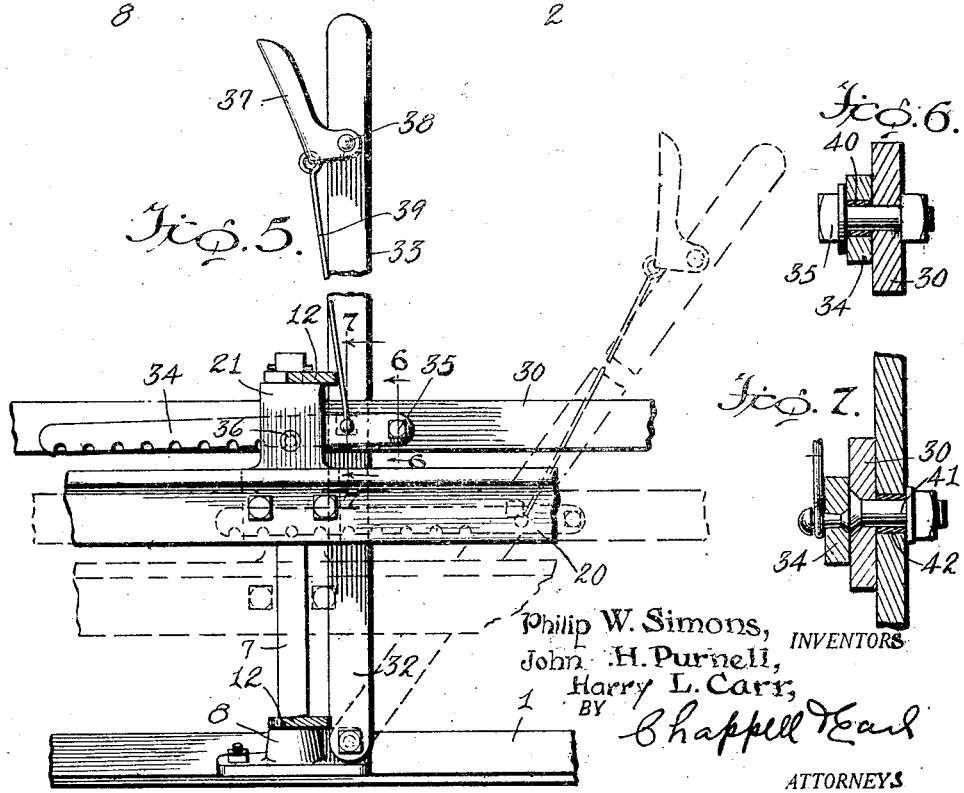

Patented Feb. 9, 1926.

1,571,974

UNITED STATES PATENT OFFICE.

PHILIP W. SIMONS, JOHN H. PURNELL, AND HARRY L. CARR, OF HASTINGS, MICHIGAN; SAID PURNELL AND SAID CARR ASSIGNORS TO SAID SIMONS.

COMBINED HARROW AND FLOAT OR CLOD CRUSHER.

Application filed April 7, 1924. Serial No. 704,637.

*To all whom it may concern:*

Be it known that we, PHILIP W. SIMONS, JOHN H. PURNELL, and HARRY L. CARR, citizens of the United States, residing at Hastings, county of Barry, State of Michigan, have invented certain new and useful Improvements in Combined Harrows and Floats or Clod Crushers, of which the following is a specification.

This invention relates to improvements in combined harrows and floats or clod crushers.

The main objects of this invention are:

First, to provide an improved implement of the class described which is very efficient, the ground being thoroughly covered for crushing the clods and smoothing and also thoroughly harrowed.

Second, to provide an improved implement having these advantages which is quite simple in structure and at the same time the parts are so arranged that they are not likely to be injured in use.

Third, to provide an implement of the class described which is easily adjusted to support the teeth in the desired relation to the surface worked, that is, to control the depth at which the teeth shall enter the ground.

Fourth, to provide in an implement of the class described improved means of mounting the teeth whereby they may be effectively supported in stepped relation and the teeth positioned relative to each other to compensate for distortion or lateral springing thereof.

Objects pertaining to details and economies of construction and operation will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this application, in which:

Fig. I is a plan view of a structure embodying the features of our invention, a portion of the teeth being omitted and others partially broken away for convenience in illustration.

Fig. II is a side elevation.

Fig. III is a detail view partially in vertical transverse section on a line corresponding to line 3—3 of Fig. I.

Fig. IV is a vertical transverse section on a line corresponding to line 4—4 of Fig. I.

Fig. V is an enlarged fragmentary inside view.

Fig. VI is a detail section on a line corresponding to line 6—6 of Fig. V.

Fig. VII is a detail section on a line corresponding to line 7—7 of Fig. V.

Fig. VIII is a plan view of one of the tooth supporting brackets.

Fig. IX is a side view of one of the teeth and its supporting bracket.

Fig. X is a detail section on a line corresponding to line 10—10 of Fig. III.

In the drawing similar reference characters refer to similar parts throughout the several views, and the sectional views are taken looking in the direction of the little arrows at the ends of the section lines.

Referring to the drawing, we provide a pair of float members 1 of substantial width, these float members being disposed in a rearwardly diverging relation and inclined inwardly as illustrated. At their front ends the float members are connected to a triangular shoe 2, the shoe being upwardly offset at 3 to receive the forward ends of the float members.

The shoe terminates at its forward end in an upwardly projecting draft standard 4 having a series of holes 5 therein with which the draft clevis 6 may be engaged.

Each float member is provided with a pair of uprights 7 which are supported in the sockets 8 carried by the floats. The front uprights are connected by the cross bar 9 having a downward offset 10 therein as shown in Fig. IV. The rear uprights are connected by the cross bar 11 connected to the uprights by means of the yoke-like couplings 12, the couplings carrying the brackets or braces 13 to facilitate connecting the cross bars thereto; see Fig. III.

The longitudinal bars 14 are secured to these cross bars and in addition to constituting frame members form a support for the seat 15 carried by the spring standard 16. Draw bars 18 extend rearwardly from the draft standard 4 and are connected to the front ends of these longitudinal bars 14 and to the cross bar 10 at 19. This arrangement of parts results in a rigid frame and one which is adapted to withstand the strains to which it may be subjected in use.

We provide a pair of tooth bars 20 which are mounted on the hangers 21 having laterally projecting spaced ears 22 slidably engaging the uprights 7. The teeth 23 in the structure illustrated are spring teeth, the same being mounted on the brackets 24 projecting inwardly from the tooth bars. These brackets have flat heads or plates 25 at their outer ends having holes 26 therein and slots 27. The holes 26 are engaged by bolts 28 while the slots are engaged by bolts 29 so that the brackets may be angularly adjusted relative to the tooth bars, thereby positioning the teeth. It will be understood that spring teeth are sometimes distorted in use and it is to be desired that they shall be uniformly spaced, particularly where provided with plates as in the structure illustrated.

The tooth bar hangers are adjustably supported upon the uprights by means of the bars 30 which are arranged between the ears of the hangers and are carried by the links 31 and 32, the bars 30 being slidable through the hangers. The rear links 32 are extended into adjusting levers 33. The adjusting racks 34 are pivotally mounted on the bars 30 at 35 to engage the pin-like keepers 36 on the rear tooth bar hangers. Hand levers 37 are pivoted at 38 on the adjusting levers and connected by the links 39 to the racks 34. By this means the racks may be lifted to engage them from the keeper pins, the racks engaging with the pins by gravity. This provides a very simple and at the same time a substantial means of securing the parts in their adjusted position.

The pivots 35 of the racks 34 are provided with spacing sleeves 40 to prevent clamping of the racks. The pivots 41 connecting the hanger bars 30 to the supporting links are provided with spacing sleeves 42, these spacing sleeves also serving as bushings to receive the wear of the parts, the same being illustrated as of bearing metal.

The teeth 23 are adjustably secured to the tooth supporting brackets 24 by means of the clips 43 and the bolts 44, the springs terminating in the curved ends 45 engaging the brackets as shown in Fig. IX.

The uprights 7 are preferably of rectangular cross section and the openings 22′ in the arms 22 of the brackets 21 are elongated as shown in Fig. X so that the parts do not bind should the float members be sprung as might occur when resting upon a stone or other obstruction.

The float members or clod crushers not only smooth the ground but crush the clods and lumps so that the ground is left in a very desirable condition.

We have illustrated and described our improvements in an embodiment which we have found very practical. We have not attempted to illustrate or describe certain modifications or adaptations as we believe the disclosure made will enable those skilled in the art to which our invention relates to embody or adapt the same as may be desired.

Having thus described our invention what we claim as new and desire to secure by Letters Patent is:

1. In a structure of the class described, the combination of a shoe terminating in a standard at its front end, a pair of inwardly inclined rearwardly diverging float members secured to said shoe, uprights carried by said float members, front and rear cross bars connecting said uprights, longitudinal frame bars mounted on said cross bars, draw bars connected to the front cross bar, to the front ends of said longitudinal bars and to said standard, tooth bars having teeth mounted thereon, hangers for said tooth bars slidably mounted on said uprights, hanger bars slidably engaged with said hangers, supporting links pivotally mounted on said float members and pivotally connected to said hanger bars, and means for securing said hanger bars in their adjusted positions.

2. In a structure of the class described, the combination of a pair of inwardly inclined rearwardly diverging float members, uprights carried by said float members, tooth bars having teeth mounted thereon, hangers for said tooth bars slidably mounted on said uprights, hanger bars slidably engaged with said hangers, supporting links pivotally mounted on said float members and pivotally connected to said hanger bars, and means for securing said hanger bars in their adjusted positions.

3. In a structure of the class described, the combination of a pair of inwardly inclined rearwardly diverging float members, uprights carried by said float members, tooth bars having teeth mounted thereon, hangers for said tooth bars slidably mounted on said uprights, hanger bars slidably engaged with said hangers, supporting links pivotally mounted on said float members and pivotally connected to said hanger bars, the rear supporting links being extended into adjusting levers, adjusting racks pivotally mounted on said adjusting bars, the rear hangers being provided with keepers with which said racks coact, hand-pieces pivotally mounted on said levers, and links connecting said handpieces to said racks whereby they may be disengaged from their keepers.

4. In a structure of the class described, the combination of a shoe terminating in a standard at its front end, rearwardly diverging float members secured to said shoe, uprights carried by said float members, front and rear cross bars for connecting said uprights, longitudinal frame bars mounted on said cross bars, draw bars connected to the front cross bars, to the front ends of said longitudinal bars and to said standard, tooth bars slidably mounted on said uprights and having teeth mounted thereon, and means for adjustably supporting said tooth bars on said uprights.

5. In a structure of the class described, the combination of float members, uprights carried by said float members, tooth bars having teeth mounted thereon, hangers for said tooth bars slidably mounted on said uprights, hanger bars slidably engaged with said hangers, supporting links pivotally mounted on said float members and pivotally connected to said hanger bars, the rear supporting links being extended into adjusting levers, adjusting racks pivotally mounted on said adjusting bars, the rear hangers being provided with keepers with which said racks coact, hand pieces pivotally mounted on said levers, and links connecting said handpieces to said racks whereby they may be disengaged from their keepers.

6. In a structure of the class described, the combination of float members, uprights carried by said float members, tooth bars having teeth mounted thereon, hangers for said tooth bars slidably mounted on said uprights, hanger bars slidably engaged with said hangers, supporting links pivotally mounted on said float members and pivotally connected to said hanger bars, and means for securing the parts in their adjusted positions.

7. In a structure of the class described, the combination of float members rigidly connected at their front ends, uprights carried by said float members, tooth bars having teeth mounted thereon, hangers for said tooth bars slidably mounted upon said uprights, hanger bars slidably engaging said hangers, supporting links pivotally mounted on said float members and pivotally connected to said hanger bars, and means for supporting said hanger bars in their adjusted positions.

8. In a structure of the class described, the combination of rearwardly diverging tooth bars, a series of tooth supporting brackets having attaching portions pivotally mounted on said bars, said attaching portions having slots therein, bolts engaging said slots whereby the brackets are adjustably supported, and spring teeth mounted on said brackets whereby they are supported in stepped relation, the said brackets being adjustable to position the teeth.

9. In a structure of the class described, the combination of rearwardly diverging float members, rearwardly diverging float bars adjustably mounted on said float members in planes above and parallel thereto, inwardly projecting tooth brackets independently and adjustably mounted on said tooth bars for adjustably supporting the teeth at the inside of the float members in stepped series, and means for raising and lowering said tooth bars relative to said float members.

10. In a structure of the class described, the combination of a shoe terminating in a draft standard at its front end, a pair of inwardly inclined rearwardly diverging float members secured to said shoe, tooth bars mounted on said float members for vertical adjustment in planes parallel thereto, and inwardly projecting tooth supporting brackets on said tooth bars.

In witness whereof we have hereunto set our hands.

PHILIP W. SIMONS.
J. H. PURNELL.
HARRY L. CARR.